Patented Apr. 22, 1941

2,239,079

UNITED STATES PATENT OFFICE 2,239,079

INSECTICIDAL COMPOSITION

Gerald H. Coleman and Clarence L. Moyle, Midland, Mich., assignor to The Dow Chemical Company, Midland, Mich., a corporation of Michigan No Drawing. Application March 1, 1939, Serial No. 259,234

6 Claims. (Cl. 167—24)

This invention relates to insecticidal compositions, and is particularly concerned with sprays adapted for combating flies, mosquitoes, moths and similar household insects.

Petroleum distillate sprays comprising insecticidal plant products are widely used for the control of household insect pests. Pyrethrin-containing sprays have a quick paralyzing effect on flies, but the kill obtained therewith is low compared to the per cent knockdown of insects. Sprays comprising rotenone have been found to give a better kill, but have a relatively slow rate of knockdown and require a considerable period of time to kill the sprayed insects. A further disadvantage in the use of both rotenone- and pyrethrin-containing compositions is that these toxicants are very unstable to heat and light, and upon storage lose their effectiveness to an appreciable degree.

We have discovered that when a small amount of a halo-phenoxy-alkyl-thiocyanate is dissolved in a spray solution of pyrethrin, rotenone, or the equivalent, an improved composition is obtained which shows increased stability to heat and light and superior insecticidal properties. These improved compositions give high and quick knockdowns and percentage kills on flies and related insects which more closely approximate knockdown than do sprays heretofore employed for such purpose.

According to the invention, the halo-phenoxy-alkyl-thiocyanates also may be employed as substitutes for pyrethrin and rotenone in spray compositions. Dispersions of these thiocyanates have a high insecticidal toxicity and are further advantageous in that they are substantially colorless and odorless and stable to heat, light and air. When the halo-phenoxy-alkyl thiocyanates are used alone as toxicants in spray compositions, concentrations of from about 1 to about 10 grams per 100 milliliters of solution are most satisfactory. For use in stabilizing and/or fortifying non-aqueous pyrethrin- or rotenone-containing spray solutions, the thiocyanate is employed in amounts ranging between 0.5 and 5 grams per 100 milliliters of solution.

The halo-phenoxy-alkyl-thiocyanates may be prepared by reacting a halo-phenoxy-alkyl halide with an alkali metal thiocyanate. For example, a halo-phenoxy-alkyl bromide and sodium thiocyanate may be dispersed in alcohol and the mixture heated at from 75° to 90° C. under reflux to accomplish reaction. While any suitable proportions of the reactants may be employed, substantially equimolecular proportions thereof give the desired compounds in good yield. Following the reaction, the mixture is treated in any suitable manner to isolate the halo-phenoxy-alkyl-thiocyanate. A co-pending application, Serial No. 237,060, by Gerald H. Coleman, discloses in detail the preparation and properties of a number of these compounds. These halo-phenoxy-alky-thiocyanates are substantially odorless, comparatively innocuous as regards their effect on human beings and warm-blooded animals, and readily soluble in most organic solvents including petroleum distillates. Particularly advantageous is the fact that they do not cause irritation or dermatitis upon contact with living tissue and skin.

The halo-phenoxy-alkyl halides employed as reactants according to the foregoing procedure may be prepared by reacting an alkali metal salt of a halo-phenol with an equimolecular proportion of an alkylene or poly-methylene halide, under such conditions of temperature and pressure as favor the replacement of a single halogen atom in the aliphatic chain by the halo-phenoxy group.

The terms "per cent" and "percentage," as employed in the specification and claims with reference to the composition of various spray materials, refer to grams per 100 milliliters thereof unless otherwise specified. For purpose of comparison in the examples, control determinations were made with a pyrethrin solution consisting of the extracted toxic principles from 1 pound of pyrethrum flowers dissolved in 1 U. S. gallon of a petroleum distillate having a boiling range of 345°–508° F. and a flash point of 137° F.

The invention is illustrated by the following examples:

Example 1

Beta-(4-chloro-phenoxy)-ethyl-thiocyanate (boiling at 153°–155° C. at 3 millimeters pressure and having a specific gravity of 1.286 at 20°/4° C.) was dissolved in the petroleum distillate employed in the preparation of the control pyrethrin solution in amount sufficient to give a 3 per cent solution. This solution was employed as a spray composition against three-day old house flies according to the Peet-Grady method, substantially as described in Soap, 8 No. 4, 1932. This composition knocked down 100 per cent of the test insects in 10 minutes and killed 90 and 95 per cent of the flies in 24 and 48 hours, respectively. The air-dispersed composition was substantially non-irritating to the mucous membrane and was substantially odorless. The control pyrethrin solution in an analogous test gave a knockdown of 100 per cent of the flies in 10 minutes and a kill of 52 per cent in 48 hours. In a similar manner, other halo-phenoxy-alkyl-thiocyanates were tested to determine their efficiency as fly spray toxicants. The data set forth in the following table is representative of the results obtained with 3 per cent solutions of such toxicants.

Table

| Compound | Per cent knockdown in 10 minutes | Per cent mortality in 48 hours |
| --- | --- | --- |
| Gamma-(2.4.6-trichloro-phenoxy)-propyl-thiocyanate (boiling point 195°–196° C. at 4 millimeters pressure) | 100 | 92 |
| Beta-(2.4.6-trichloro-phenoxy)-ethyl-thiocyanate (boiling point 185°–186° C. at 3 millimeters pressure) | 98 | 81 |
| Beta-(4-bromo-phenoxy)-ethyl-thiocyanate (boiling point 181°–182° C. at 3 millimeters pressure) | 100 | 86 |

*Example 2*

200 milliliters of the pyrethrin control solution was diluted with an equal volume of petroleum distillate to obtain a spray of half the pyrethrin content present in the original control solution. Gamma-(2.4.6-trichloro-phenoxy)-propyl-thiocyanate was dissolved in a portion of this pyrethrin control solution in amount of 0.8 per cent by volume thereof. A spray material was also prepared consisting of 0.8 per cent of the thiocyanate compound dissolved in the petroleum distillate. The initial toxicity of each of these three solutions was determined according to the Peet-Grady method and samples thereof subsequently subjected to such conditions of light and heat as ordinarily favor decomposition of pyrethrin-containing spray compositions. This was an accelerated decomposition test wherein the subject compositions were exposed to the ultra violet rays of a mercury arc lamp in a fadeometer, the lamp producing an intensity of light approximately equal to 4,000 foot-candles, and the temperature of the samples during the test being at about 57° C. In the initial test according to the Peet-Grady method, the half-strength pyrethrin control solution gave a knockdown of 96 per cent and a kill of 23 per cent. The solution comprising both pyrethrin and the gamma-(2.4.6-trichloro-phenoxy)-propyl-thiocyanate knocked down 99 per cent of the flies and killed 41 per cent, and the 0.8 per cent solution of the thiocyanate compound alone knocked down 95 per cent and killed 14 per cent of the test insects. After 24 hours' exposure in the fadeometer, the pyrethrin control solution showed a kill of only 15 per cent, while the solution containing the combination of the pyrethrin and thiocyanate toxicants killed 50 per cent of the flies.

By substituting other halo-phenoxy-alkyl-thiocyanates for those disclosed in the foregoing examples, insecticidal compositions of comparable efficiency may be obtained. Representative of the compounds which may be so employed are beta-(2-chloro-phenoxy)-ethyl-thiocyanate; beta-(2.4-dichloro-phenoxy)-ethyl-thiocyanate; beta-(2.4.6-tribromo-phenoxy)-ethyl-thiocyanate; beta-(2.6-dichloro-4-bromo-phenoxy)-ethyl-thiocyanate; beta-(pentachloro-phenoxy)-ethyl-thiocyanate; beta-(2.4.5-trichloro-phenoxy)-ethyl-thiocyanate; beta-(2.4.5-trichloro-6-bromo-phenoxy)-ethyl-thiocyanate; beta-(4-iodo-phenoxy)-ethyl-thiocyanate; beta-(4-chloro-phenoxy)-propyl-thiocyanate; gamma-(2-chloro-phenoxy)-propyl-thiocyanate; gamma-(4-bromo-phenoxy)-propyl-thiocyanate; gamma-(4-chloro-phenoxy)-isobutyl-thiocyanate; delta-(2.4.5-trichloro-phenoxy)-n-butyl-thiocyanate; gamma-(4-bromo-phenoxy)-isobutyl-thiocyanate; beta-(4-chloro-phenoxy)-amyl-thiocyanate; beta-(2.4.6-trichloro-phenoxy)-hexyl-thiocyanate; and the like. Mixtures of the above compounds may be similarly employed as, for example, the thiocyanates prepared from mixed mono-chloro- and mono- and di-chloro-phenol fractions, mixtures of isomeric bromo-phenols, etc., or mixtures of halo-phenoxy-ethyl- and halo-phenoxy-propyl-thiocyanates.

Instead of the pyrethrins, extracts of derris, cubé, barbasco and related plant products may be used in combination with the halo-phenoxy-alkyl-thiocyanates. In such compositions, the thiocyanate also serves as a solubilizing agent. Besides petroleum distillates, other organic solvents such as benzene, ethylene dichloride, hydrogenated naphthalene, butyl alcohol, and the like may be employed. The phrase "non-corrosive organic solvent" as employed in the following claims refers to any organic solvent material unreactive with and capable of dissolving the toxicants hereinbefore described and non-injurious to the skin and general health of humans.

The halo-phenoxy-alkyl-thiocyanates with which this invention is particularly concerned are those having the following formula

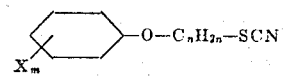

wherein X represents halogen, $n$ is an integer from 2 to 6, inclusive, and $m$ is an integer not greater than 5.

Other modes of applying the principle of our invention may be employed instead of those explained, change being made as regards the materials or the amounts thereof employed, provided the compositions defined by any of the following claims or their equivalents be obtained.

We therefore particularly point out and distinctly claim as our invention:

1. An insecticidal spray comprising a non-corrosive organic solvent having dissolved therein a product selected from the class consisting of the extracts of pyrethrin- and rotenone-bearing plants, and as an active toxicant and stabilizer a halo-phenoxy-alkyl-thiocyanate.

2. An insecticidal spray comprising a non-corrosive organic solvent having dissolved therein a product selected from the class consisting of the extracts of pyrethrin- and rotenone-bearing plants, and as an added toxicant and stabilizer an amount ranging between 0.5 and 5 grams per 100 milliliters thereof of a halo-phenoxy-alkyl-thiocyanate.

3. An insecticidal spray comprising a petroleum distillate having dissolved therein a product selected from the class consisting of the extracts of pyrethrin- and rotenone-bearing plants, and as an added toxicant and stabilizer a compound having the formula

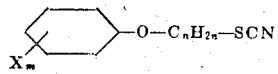

where X represents halogen, $n$ is an integer from 2 to 6, inclusive, and $m$ is an integer not greater than 5.

4. An insecticidal spray comprising a petroleum distillate having dissolved therein a product selected from the class consisting of the extracts of pyrethrin- and rotenone-bearing plants, and as an added toxicant and stabilizer a halophenoxy-ethyl thiocyanate.

5. An insecticidal spray comprising a petroleum distillate having dissolved therein a product selected from the class consisting of the extracts of pyrethrin- and rotenone-bearing plants, and as an added toxicant and stabilizer a halophenoxy-propyl thiocyanate.

6. An insecticidal spray comprising a petroleum distillate having dissolved therein a product selected from the class consisting of the extracts of pyrethrin- and rotenone-bearing plants, and as an added toxicant and stabilizer a compound having the formula

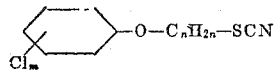

wherein $n$ is an integer from 2 to 6, inclusive, and $m$ is an integer not greater than 5.

GERALD H. COLEMAN.
CLARENCE L. MOYLE.